United States Patent [19]
Erickson

[11] 3,804,210

[45] Apr. 16, 1974

[54] CANCELLATING DEVICE FOR SUPPRESSING OSCILLATIONS OF STRUCTURES IN FLUID FLOW

[76] Inventor: Albert L. Erickson, 231 Vine St., Menlo Park, Calif. 94025

[22] Filed: June 29, 1972

[21] Appl. No.: 267,392

[52] U.S. Cl. .............................................. 188/1 B
[51] Int. Cl. .............................................. F16f 7/00
[58] Field of Search ...................... 73/522; 188/1 B

[56] References Cited
UNITED STATES PATENTS

| | | | |
|---|---|---|---|
| 2,154,442 | 4/1939 | Diehl | 188/1 B |
| 3,491,857 | 1/1970 | Reed | 188/1 B |
| 2,859,836 | 11/1958 | Wiener | 188/1 B |

*Primary Examiner*—Duane A. Reger
*Attorney, Agent, or Firm*—Limbach, Limbach & Sutton

[57] ABSTRACT

Method and apparatus for suppressing fluid flow induced oscillations in structures such as smokestacks, suspended cables and periscopes, by altering the outer surface configuration of the structure to provide a portion thereof which is subject to flow induced forces out of phase with the flow induced forces on the remaining structure wherein there is an overall cancellation of forces and the structure is nearly stationary.

16 Claims, 14 Drawing Figures

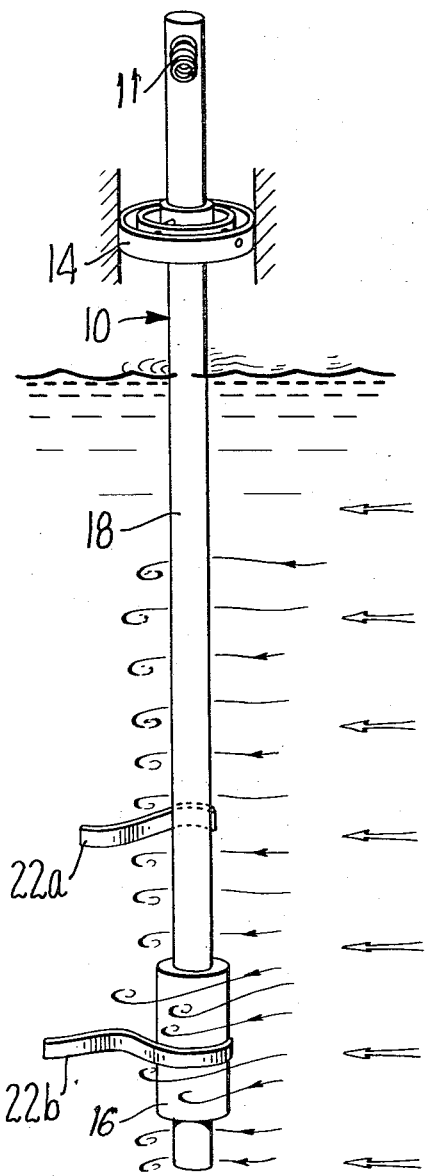
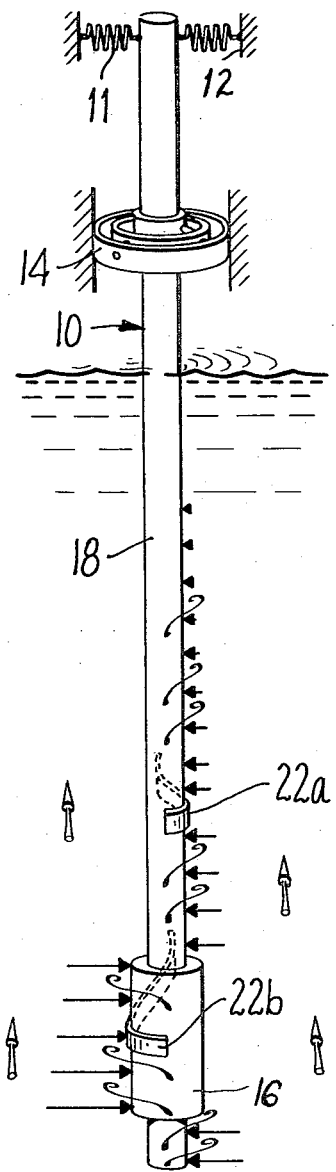
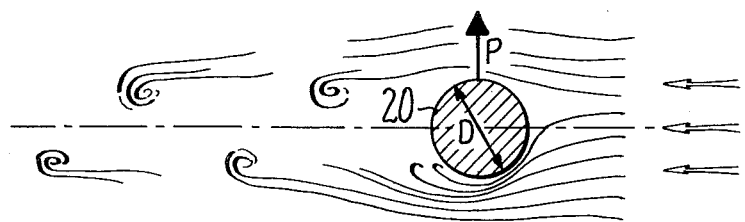
FIG. 1.
FIG. 2.
FIG. 3.

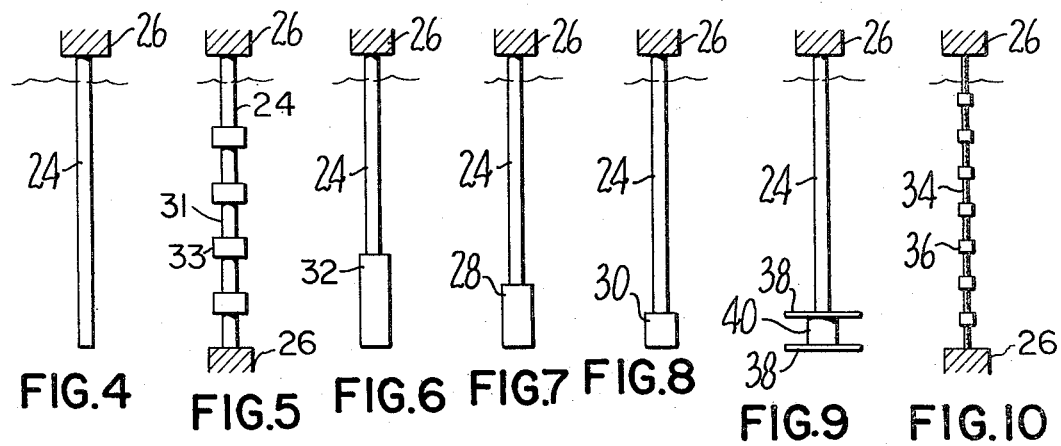

CANCELLATING DEVICE FOR SUPPRESSING OSCILLATIONS OF STRUCTURES IN FLUID FLOW

BACKGROUND OF THE INVENTION

This invention relates to methods and apparatus for attenuating or suppressing structural oscillations induced by the flow of fluids around structures. Commonly, oscillations or vibrations are induced in smokestacks, electrical transmission lines and other similar erect or suspended structures in air, and pilings, periscopes, cables and similar structures in water by action of the air or water flowing around the structure. Fluids flowing around structures can cause damaging oscillations particularly when the frequency of oscillation matches the natural or resonant frequency of the structure. The induced oscillations are caused by vortices shed as the fluid passes around the structure. For certain structures such as cylinders, the vortex shedding assumes a regular alternating pattern with vortices shed first from one side of the cylinder and then the other. The pattern developed from this phenomenon is commonly called a von Kármán vortex street. In the vicinity of the shedding the flow behavior generates an alternating force on the cylinder lateral to the relative direction of flow. This alternating lateral force generates the vibration or oscillation of the structure.

Previous attempts to suppress this type of vibration or oscillation have principally been directed to vibration damping devices. For example, Sielaff, U.S. Pat. No. 3,188,644, shows damping of vibrations in antenna elements by weighted rubber diaphragms which absorb energy by flexing. Bouche et al., U.S. Pat. No. 3,246,073 shows damping of vibrations in suspended outdoor wires by dampeners having a rigid outer shell and a soft filler core which encase the wire and absorb energy by radial compression and expansion of the filler material. Chen, U.S. Pat. No. 3,245,177 shows damping of vibrations in a smokestack by motion of liquid, with or without suspended particles, encased in an annular receptacle around the top of the smokestack.

Each of the above vibration damping devices attempts to suppress vibrations by dynamic to thermal energy conversion. My invention does not involve dampening by such energy conversion. Rather, it relates to cancellation of the oscillatory force through a structural configuration of the outer surface of the apparatus.

SUMMARY OF THE INVENTION

I have discovered that periodic forces generated by flow behavior on one portion of a structure can be effectively cancelled by induced periodic forces generated by flow behavior on another portion of the structure which latter forces are out of phase with former forces. From this discovery I have invented a method of suppressing oscillations and vibrations in structures by varying the configuration of the outer surface of the structure to produce an effective cancellation of forces generated during vortex shedding. For a cylindrical structure in a fluid flow transverse to the axis of the cylinder, this can be accomplished by providing on portions of the structure, cylindrical surfaces of approximately twice the diameter of the original structure.

It is believed that for a structure subject to fluid flow there is a time delay from the initiation of the deviant flow behavior on the surface of the structure to the resultant development of the lateral forces. For a particular system of constant flow velocity the time delay is dependent on the diameter of the structure, i.e. the relative distance the flow must travel around the structure. In having different portions of a given structure of different diameter, the time delay will differ for each portion, and the resulting lateral forces will differ in phase. By doubling the relative distance of flow travel around a portion of a structure, the phase will be shifted such that the periodic forces developed in this portion will oppose those developed in the remaining portion of the structure. This concept, and the method and apparatus for practicing my discovery will be considered in greater detail in the following specification and accompanying drawings.

BRIEF DESCRIPTION OF THE DRAWINGS

FIG. 1 is a perspective view of a cancellating device mounted on a cylindrical structure in a fluid flow.

FIG. 2 is a perspective view of the cancellating device and structure of FIG. 1 and reactant flow force diagram.

FIG. 3 is a schematic view of a vortex pattern in a cylinder wake.

FIG. 4 is a schematic illustration of a cylindrical structure immersed in water.

FIG. 5 is a schematic illustration of a cylindrical structure immersed in water with a plurality of spaced cancellators.

FIG. 6 is a schematic illustration of a cylindrical structure immersed in water with a long length cancellator at its distal end.

FIG. 7 is a schematic illustration of a cylindrical structure immersed in water with a medium length cancellator at its distal end.

FIG. 8 is a schematic illustration of a cylindrical structure immersed in water with a short length cancellator at its distal end.

FIG. 9 is a schematic illustration of a cylindrical structure immersed in water with a short length cancellator at its distal end with end plates.

FIG. 10 is a schematic illustration of a rope immersed in water with a plurality of spaced cancellators.

FIG. 11 is a schematic illustration of a cantilevered structure with a cancellator located at its distal end at the primary mode of oscillation.

FIG. 12 is a schematic illustration of the cantilevered structure of FIG. 11 with a cancellator located at its distal end and at a point of maximum displacement in the secondary mode of oscillation.

FIG. 13 is a schematic illustration of a structure pivoted at both ends with a cancellator located at a point of maximum displacement in the primary mode of oscillation.

FIG. 14 is a schematic illustration of the structure of FIG. 13 with cancellators located at points of maximum displacement in the secondary modes of oscillation.

DETAILED DESCRIPTION OF THE INVENTION

Turning to the drawings, FIGS. 1 and 2 disclose a structure 10 secured at one end to springs 11 fastened to a fixed base 12 and retained at a point removed from the base by a pivot 14. The springs 11 are adjustable vertically along the structure 10 to vary the structures resonant frequency. The free end of the structure 10 is immersed in a fluid in this case water, having a direction of flow as indicated in FIG. 1. While the particular structure 10 shown in FIGS. 1 and 2 is merely a test model, its configuration is particularly suitable for a variety of shipboard probes for collecting acoustical, thermal or other data which extend into water flowing relative to the probe.

Adjacent the distal end of the structure 10 is a cylindrical enlargement for convenience termed a cancellating device 16. The cancellating device 16 has a diameter approximately twice that of the remaining cylindrical structure which again for convenience is termed a base structure 18. The fluid flow around the overall structure 10 in FIGS. 1 and 2 is depicted for a selected instant and is not a steady state condition. To better comprehend the behavior of flow and the attendant reaction of the structure 10, FIG. 3 is of service.

FIG. 3 schematically illustrates the resultant flow pattern around a cylindrical object 20 fixed with its axis normal to the direction of fluid flow as indicated. Over a wide range of Reynolds numbers ($30 < Re < 10^5$) fluid vortices are shed in a periodic manner downstream from the cylindrical object. The vortex pattern developed is commonly called the "von Kármán vortex street". For the above range of Reynolds numbers the periodicity of the vortex street is substantially regular having a frequency of vortex shedding calculated from the Strouhal number, S, which is approximately constant within this Reynolds range, having a value generally between 0.18 and 0.21. The frequency of shedding is determined from the following formula:

$$a.\ f = SV/D$$

where $f$ = frequency, $S$ = Strouhal number which for most purposes can be adopted as 0.2, $V$ = free-stream velocity of the fluid, and $D$ = diameter of the cylinder.

In the vicinity of vortex shedding the flow behavior generates an alternating lateral force on the cylindrical object. The maximum magnitude of the lateral force is in a direction away from the last vortex and is calculated from the following formula:

$$b.\ F = CA(\rho V^2/2g)$$

where $F$ = lateral force, $C$ = lateral force coefficient which is dimensionless and dependent upon shape of the object and upon flow characteristics, $A$ = projected area perpendicular to the flow, $\rho$ = fluid density, $V$ = free-stream velocity and $g$ = gravitational constant. If the object is firmly restrained so as not to move in the flow, an oscillating force at the frequency of vortex shedding calculated from the above formula is measured. However, if the object is mounted flexibly so as to move in response to the fluid dynamic loads, it is found in practice that the oscillation frequency is somewhat less than the calculated shedding frequency. This may be attributed to a change in the dynamic system when the object oscillates as opposed to a static system when the object is fixed.

It has been discovered that the phase of the lateral unsteady forces is altered on change of diameter of the cylindrical structure. This becomes manifest when a single structure is divided into sections of different diameter. For example, considering FIGS. 1 and 2, if streamers 22a and 22b are attached to the leading edges of two different diameter sections, they will wash back and forth around the respective structures, first on one side, and then the other, yet not be in concert. For the extreme case shown in the FIGS. 1 and 2, the streamers 22a and 22b will be out of phase. Since it is the flow behavior which generates the resultant forces acting on the structure, the resultant forces on each section will likewise be out of phase and for the example depicted, be a maximum of 180° out of phase.

While the precise theoretical effects of flow behavior around a structure having a cancellating device cannot be established with certainty, the following conclusions can be drawn from observing the behavior of various structures in operation. When a cylindrical base structure 24 such as that shown in FIG. 4 is cantilevered in a moving fluid stream, oscillations are induced which are restrained by reaction loads in the structure's support 26. These oscillations assume a regular frequency and theoretically can be calculated from the above formula a.

When a cancellating device 28 such as that shown in FIG. 7 is placed on the distal end of the base structure 24, the oscillations are suppressed most effectively when the diameter of the cancellating device 28 is approximately twice that of the base structure 24, and the length is selected on the factors of projected area and force moments. Streamers 22a and 22b attached to the leading edge of the cancellating device and base structure react in the manner above described, washing from one side and then the other, out of phase as shown in FIGS. 1 and 2.

When a cancellating device 30 such as that shown in FIG. 8 is placed on the distal end of the base structure the oscillations are suppressed, but a residual induced oscillation remains having approximately the same frequency as that of the base structure 24 of FIG. 4. In this case the cancellating device is of insufficient size to wholly suppress the oscillations of the base structure.

However, when a cancellating device 32 such as that shown in FIG. 6 is placed on the distal end of the base structure, the oscillations are again suppressed, but the residual oscillations assume approximately the expected frequency of a cylindrical structure having the diameter of the cancellating device. In this case the cancellating device is of too great a size and now becomes the driving structure. In this respect it becomes apparent that a force cancellating device can in fact be a portion of a structure having a diameter of one half the remaining structure.

Theoretically, structures of different diameters in a constant velocity flow system will have different oscillation frequencies since the frequency, according to formula a, is inversely dependent on the diameter. However, in a single structure having different diameter sections, there is a primary or dominant drive frequency to which the remaining structure follows.

Consider a cylinder oscillating back and forth in a stationary fluid. If the flow could adjust itself instantaneously to changes in the motion of the cylinder, the force imposed by the fluid on the cylinder would always oppose the cylinder motion and we would not have a self-excited system but a damped system. In nature, however, there is a time lag.

Consider a cylinder in a free stream as shown in FIG. 3. The flow pattern at a select instant is as shown. The flow separates on the flanks of the cylinder and forms a low velocity wake region behind the cylinder with vortices that are shed alternately from one separation point, then the other. Changes in the cylinder velocity (or velocity over the cylinder) do not cause instantaneous changes in the flow pattern because a time lag is required to "telegraph" the change through the flow. Laws governing this lag in separated flow have not, however, been established in pure theory.

Consider now the concept for a cylinder oscillating laterally in a direction normal to an oncoming flow. If the flow were established instantaneously, the lateral forces developed would oppose the motion. Let us define this condition as the lateral force being in phase with the lateral oscillation velocity. The lateral force is a maximum when the oscillation velocity is a maximum and zero when the oscillation velocity is zero, and, is in a direction opposing the motion of the cylinder. In this case the cylinder is stable because the lateral forces induced by motion oppose the motion. In order for instability to occur, the forces must lag the motion sufficiently so that they are out of phase with the motion. The maximum instability will occur when the phase lag is 180° relative to the velocity. Here the forces would be in the same direction as the motion, which would tend to amplify the motion.

In order to change the situation the phase lag must be changed by another 180° to bring the forces back in phase with the lateral velocity creating an attenuated system. This phase lag is believed related to the time that it takes to telegraph the disturbance around the cylinder periphery. The time is proportional to D/V where D is diameter and V is the free-stream velocity of a system. If in a given system some of the flow is obliged to travel twice as far to telegraph its effect, the time lag is doubled and the phase lag is shifted. Thus by doubling the diameter of a portion of the cylinder in the given system, induced forces on this double diameter portion of the cylinder will be out of phase with the induced forces on the remaining cylinder. The forces being opposed cancel and the system is attenuated.

The simplest embodiment of this concept then is one in which a cylindrical base structure 24 retained at each end by supports 26 is divided into segments and every other segment has a diameter twice the diameter of the intervening parts in the manner shown in FIG. 5. The length of the intervening segments 31 should be twice that of the other segments 33 since the projected areas should be equal. The magnitude of the resultant force is directly related to the projected area as note in formula b.

This simple embodiment is particularly effective for a rope 34 secured at each end to supports 26 as depicted in FIG. 10 and other flexible cables and the like having multiple modes of vibration. In actual practice the cancellating device 36 on a flexible structure such as shown in FIG. 10 need not be as closely spaced as theoretically required because of the inherently damping characteristics of flexible materials.

For other more rigid structures the calculated length of the cancellating device may be insufficient. There are apparently interference effects at the intersection of cancellating device and base structure which detract from the effectiveness of the cancellating device. For example, in one case a cancellating device of calculated length, which was not wholly effective, achieved increased effectiveness by adding concentric end plates 38 to the ends of the cancellating device 40 on cylindrical support structure 24 cantilevered from support 26 as shown in FIG. 9. Without the end plates approximately twice the theoretical length of cancellating device was required to eliminate the instability of a cantilevered structure. Thus, in addition to calculating the length of cancellating device required for a theoretical moment balance, when dealing with a cantilevered structure, a performance factor should also be considered in the design of a fully attenuated system. For cantilevered structures this factor is approximately 2, the cancellating device needed, being twice as long as theoretically required.

Furthermore, when the base structure is semi-rigid, bending modes in addition to the primary mode should be considered. For example, in FIG. 11 a cancellating device 42 located at the distal end of a cantilevered structure 43 is properly located if the structure oscillates in the primary mode, however, if the structure 43 can be induced to oscillate in a secondary mode as shown in FIG. 12 an additional cancellating device 44 located at the point of maximum displacement on the second mode will be necessary to fully attenuate the oscillations. Similarly, in a structure 46 pivoted at both ends as shown in FIG. 14 a single cancellating device 48 located at the point of maximum displacement is sufficient if the structure vibrates in only the primary mode. However, if the structure vibrates principally in the second mode as shown in FIG. 14, two cancellating devices 50 located at the point of maximum displacement will be necessary. Usually a structure so arranged will shift modes and a third cancellating device 48 shown in phantom in FIG. 14 and located as in FIG. 13 will be necessary. For long structures suspended in the manner shown in FIGS. 13 and 14 such as cables, which have a plurality of vibration modes, randomly spaced cancellating devices along the entire length would be effective in breaking up modal vibrations.

While cylinders provide the simplest example of a structure subject to induced oscillations or vibrations from fluid flow, it is not intended to limit this invention to such structures. Tapered structures of circular cross-section, structures with elliptical cross-sections and generally structures with a blunt leading edge and a non-streamline trailing edge are subject to oscillations or vibrations induced by fluid flow. Nor must the cancellating device be restricted to a cylindrical configuration. The cross-section of the cancellating device may assume a cross-section similar to the remaining structure or variations thereof so long as the effective distance the flow disturbance must travel to telegraph its lateral force effect is altered sufficiently to shift the phase lag of the resultant forces to oppose the motion of oscillation. Thus the cancellating device may have a diameter approximately one-half as well as approximately twice the diameter of the base structure for effective oscillation suppression.

What is claimed is:

1. A method of suppressing fluid flow induced oscillations in structures immersed in a directional fluid flow with relative movement around the structures comprising: forming a first surface portion on said structures on which first periodic forces transverse to the direction of fluid flow are induced by alternate vortex shedding around the first surface portion; and forming a second surface portion on said structures on which second periodic forces transverse to the direction of fluid flow are induced by alternate vortex shedding around the second surface portion, which second periodic forces are out of phase with said first forces.

2. A method of suppressing fluid flow induced oscillations in structures immersed in a direction fluid flow with relative movement around the structures comprising adding to the said structures at least one structural enlargement thereto which generates periodic forces on the enlargement transverse to the direction of the fluid flow, said forces being induced by alternate vortex shedding around the structural enlargement in opposition to periodic forces on the remaining structure transverse to the direction of fluid flow, said latter forces being induced by alternate vortex shedding around the remaining structure.

3. The method of claim 2 wherein the enlargement added to structures has a perimeter approximately twice that of the remaining structure.

4. A method of suppressing fluid flow induced oscillations in elongated and substantially cylindrical structures immersed in a directional fluid flow with relative movement around the structures comprising increasing the circumferential surface of at least one portion of said structures to approximately twice the circumference of the remaining portion of said structures whereby periodic forces transverse to the direction of fluid flow induced by alternate vortex shedding around the portion of the structures having the increased circumferential surface oppose periodic forces transverse to the direction of fluid flow induced by alternate vortex shedding around the remaining portion of said structures.

5. A method of suppressing fluid flow induced oscillations in elongated and substantially cylindrical structures immersed in a directional fluid flow with relative movement around the structures comprising increasing the circumferential surface of spaced portions of said structures to approximately twice the circumference of the remaining portions of said structures whereby periodic forces transverse to the direction of fluid flow induced by alternate vortex shedding around the spaced portions of the structures having the increased circumferential surface oppose periodic forces transverse to the direction of fluid flow induced by alternate vortex shedding around the remaining portions of said structures.

6. A method of suppressing fluid flow induced oscillations in structures immersed in a directional fluid flow with relative movement around the structures comprising adding to said structures at least one structural reduction thereto which generates periodic forces on the reduction transverse to the direction of fluid flow, said forces being induced by alternate vortex shedding around the structural reduction in opposition to periodic forces on the remaining structure transverse to the direction of fluid flow, said latter forces being induced by alternate vortex shedding around the remaining structure.

7. The method of claim 6 wherein the reduction added to structures has a perimeter approximately one-half that of the remaining structure.

8. A method of suppressing fluid flow induced oscillations is elongated and substantially cylindrical structures immersed in a directional fluid flow with relative movement around the structures comprising reducing the circumfernetial surface of at least one portion of said structure to approximately one-half the circumference of the remaining portion of said structures whereby periodic forces transverse to the direction of fluid flow induced by alternate vortex shedding around the portion of the structure having the reduced circumferential surface oppose periodic forces transverse to the direction of fluid flow induced by alternate vortex shedding around the remaining portion of said structures.

9. Apparatus for suppressing fluid flow induced oscillations in elongated and substantially cylindrical structures immersed in a directional fluid flow with relative movement around the structures comprising a cancellating device attached to said structures having a cylindrical configuration of diameter approximately twice the diameter of the elongated structures, said cylindrical configuration including a cylindrical surface area which generates periodic forces transverse to the direction of fluid flow induced by alternate vortex shedding around the cancellating device in opposition to periodic forces transverse to the direction of fluid flow induced by alternate vortex shedding around the remaining structure.

10. Apparatus for suppressing fluid flow induced oscillations in elongated and substantially cylindrical structures immersed in a directional fluid flow with relative movement around the structures comprising a cancellating device attached to said structures having a cylindrical configuration of diameter approximately one-half the diameter of the elongated structures, said cylindrical configuration including a cylindrical surface area which generates periodic forces transverse to the direction of fluid flow induced by alternate vortex shedding around the cancellating device in opposition to periodic forces transverse to the direction of fluid flow induced by alternate vortex shedding around the remaining structure.

11. Apparatus for immersion in a directional fluid flow with relative movement around the apparatus comprising a structure of substantially circular cross-section having a first portion generating periodic flow induced forces transverse to the direction of fluid flow on said first portion, said forces being induced by alternate vortex shedding around said first portion; and a second portion generating periodic flow induced forces transverse to the direction of fluid flow on said second portion, said latter forces being induced by alternate vortex shedding around said second portion, said periodic forces on said second portion being out of phase with said forces on said first portion.

12. Apparatus according to claim 11 wherein said second portion has a diameter approximately twice that of said first portion.

13. Apparatus according to claim 11 wherein there are a plurality of first portions and second portions on said structure.

14. Apparatus according to claim 13 wherein said second portions have a diameter twice that of said first portions.

15. Apparatus for immersion in a directional fluid flow with relative movement around the apparatus comprising a structure having a first portion generating periodic flow induced forces transverse to the direction of fluid flow on said first portion, said forces being induced by alternate vortex shedding around said first portion; and a second portion generating periodic flow induced forces transverse to the direction of fluid flow on said second portion, said latter forces being induced by alternate vortex shedding around said second portion, said periodic forces on said second portion being out of phase with said periodic forces on said first portion.

16. Apparatus according to claim 15 wherein said second portion has a perimeter approximately twice that of said first portion.

* * * * *